United States Patent
Rodgers et al.

(10) Patent No.: US 9,372,844 B2
(45) Date of Patent: Jun. 21, 2016

(54) AUTOMATICALLY GENERATING A BUSINESS PROCESS FLOW GUI USING A SYMBOLIC ANNOTATION LANGUAGE

(75) Inventors: Michael Patrick Rodgers, Aurora, CO (US); John David Holder, Centennial, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1017 days.

(21) Appl. No.: 13/460,374

(22) Filed: Apr. 30, 2012

(65) Prior Publication Data

US 2013/0086491 A1    Apr. 4, 2013

Related U.S. Application Data

(60) Provisional application No. 61/542,184, filed on Oct. 1, 2011.

(51) Int. Cl.
*G06F 17/20* (2006.01)
*G06F 17/24* (2006.01)

(52) U.S. Cl.
CPC .................... *G06F 17/241* (2013.01)

(58) Field of Classification Search
CPC ........................................ G06F 17/20
USPC ........................... 715/760, 762, 763
See application file for complete search history.

(56) References Cited

U.S. PATENT DOCUMENTS

| | | | |
|---|---|---|---|
| 5,678,052 A * | 10/1997 | Brisson ................... | G06F 8/427 704/4 |
| 5,815,152 A * | 9/1998 | Collier ..................... | G06F 8/34 715/839 |
| 6,233,537 B1 * | 5/2001 | Gryphon .................. | G06F 8/10 703/1 |
| 6,658,646 B1 | 12/2003 | Hernandez, III | |
| 7,131,071 B2 * | 10/2006 | Gune .................. | G06Q 10/0631 705/7.12 |
| 7,222,302 B2 * | 5/2007 | Hauser ................... | G06Q 10/06 709/223 |
| 7,257,575 B1 * | 8/2007 | Johnston ............. | G06F 17/2247 |
| 7,376,661 B2 * | 5/2008 | Larson ............... | G06F 9/45508 |
| 7,412,658 B2 * | 8/2008 | Gilboa ....................... | G06F 8/38 715/744 |
| 7,437,614 B2 | 10/2008 | Haswell et al. | |
| 7,562,307 B2 * | 7/2009 | Betts ................ | G06F 17/30893 715/760 |
| 7,590,942 B2 * | 9/2009 | Phillips ..................... | G06F 8/70 705/7.26 |
| 7,831,453 B2 * | 11/2010 | Das .......................... | G06F 8/10 705/348 |
| 7,870,478 B1 * | 1/2011 | Chiaro ................ | G06F 17/2229 715/223 |
| 8,108,784 B2 * | 1/2012 | Hayles ...................... | G06F 8/34 715/762 |
| 8,701,085 B2 * | 4/2014 | Woock ..................... | G06F 8/75 717/113 |

(Continued)

*Primary Examiner* — Daeho Song
(74) *Attorney, Agent, or Firm* — Vista IP Law Group, LLP

(57) ABSTRACT

A method, system, and computer program product for displaying an automatically generated graphical display of a business process flow to facilitate user interaction with enterprise software applications. A compact symbolic annotation language is used in conjunction with a flow generator to automatically generate a computer renderable description of the business process flow. The method commences by defining symbols to form an alphabet to be used in the symbolic annotation language. The compact symbolic language is capable of representing rich semantics including process operations, fork operations, and join operations. Once an agent (e.g., a person, a computer agent) has captured a particular business process flow using symbols of the compact symbolic annotation language, then a computer process performs a mapping of the symbols to a markup language. The markup language can be rendered in a graphical display. The markup language can be HTML/CSS, SVG, UML, or another markup language.

19 Claims, 14 Drawing Sheets

(56) References Cited

U.S. PATENT DOCUMENTS

| | | | |
|---|---|---|---|
| 2002/0112031 A1* | 8/2002 | Franklin | H04L 29/06 709/219 |
| 2003/0171947 A1* | 9/2003 | Ledford | G06Q 10/10 717/102 |
| 2004/0078373 A1* | 4/2004 | Ghoneimy | G06Q 99/00 |
| 2004/0243613 A1* | 12/2004 | Pourheidari | G06F 17/30864 |
| 2005/0071312 A1* | 3/2005 | Chau | G06F 17/218 |
| 2005/0071347 A1* | 3/2005 | Chau | G06F 17/218 |
| 2005/0086360 A1* | 4/2005 | Mamou | G06F 17/30563 709/232 |
| 2006/0100858 A1* | 5/2006 | McEntee | G06F 17/2247 704/10 |
| 2007/0255715 A1* | 11/2007 | Li | G06Q 10/00 |
| 2008/0115046 A1* | 5/2008 | Yamaguchi | G06F 17/214 715/201 |
| 2008/0172401 A1* | 7/2008 | Nishiyama | G06Q 10/0635 |
| 2009/0319924 A1* | 12/2009 | Slone | G06F 8/34 715/762 |
| 2012/0023421 A1* | 1/2012 | Demant | G06F 9/4445 715/760 |
| 2012/0023484 A1* | 1/2012 | Demant | G06F 8/38 717/125 |
| 2012/0196261 A1* | 8/2012 | Kim | G09B 7/02 434/322 |
| 2013/0031469 A1* | 1/2013 | Yoshizaka | G06F 17/2276 715/239 |

\* cited by examiner

3A00

First Slot: 3 Values

3B00

Second Slot: 2 Values

3C00

Third Slot: 5 Values

3D00

Fourth Slot:

3E00

Fifth Slot: 3 Values

3F00

Valid Values

AUTOMATICALLY GENERATING A BUSINESS PROCESS FLOW GUI USING A SYMBOLIC ANNOTATION LANGUAGE

RELATED APPLICATIONS

The present application claims the benefit of priority to U.S. Provisional Patent Application Ser. No. 61/542,184, entitled "SCRIPTING LANGUAGE FOR BUSINESS FLOWS IN CSS AND HTML", filed on Oct. 1, 2011, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of enterprise applications, and more particularly, to managing business process flows within enterprise applications by automatically generating a process flow graphical user interface using a symbolic annotation language.

BACKGROUND

Some embodiments of the present disclosure are directed to an improved approach for implementing automatically generating a process flow graphical user interface using a symbolic annotation language. More particularly, disclosed herein are methods and systems for automatically generating a process flow graphical user interface using a symbolic annotation language.

There is a need for generating business process flows in all modern enterprise applications. Often developers create business process flows in HTML and CSS using ad hoc techniques.

The above developer-centric regime can be improved upon since exemplary business flows can be represented in one or more pages, and exemplary instances of such pages include aspects of roles and aspects of tasks that can be structured to facilitate improved methods to create business process flows in HTML and CSS using automated techniques. Such automation can be quite involved since, in some cases, multiple organizations in an enterprise can provide input to define business flows, and the flows can become commensurately involved.

In exemplary cases, the application use cases and/or the operation strategy serves to define a model for a series of pages to capture a business flow. However, the variability between developer and page styles, and the time involved to generate these pages, makes legacy techniques expensive. Further exacerbating this are the aspects that a series of pages to capture a business flow are often subject to application development constraints such as consistency of look and feel, standardized HTML flows between different developers, and edicts to use common UI templates (e.g., intended to reinforce UI aesthetic integrity). Still worse is the sheer expense in terms of the steep learning curve involved in encoding the business knowledge into HTML and CSS.

Considering that modern business process flows incorporate the concepts of both roles and tasks, the attendant complexity of modeling of process flows, the variability between developer styles, and the time required to generate these business process flows create barriers that slow or prevent widespread adoption. Still more, there is a steep learning curve involved in encoding the business knowledge into HTML and CSS. Therefore, there is a need for an improved approach, and for implementing a symbolic annotation language for business flows in CSS and HTML that address at least these problems.

Moreover, the aforementioned technologies do not have the capabilities to perform automatically generating a process flow graphical user interface using a symbolic annotation language.

Therefore, there is a need for an improved approach for implementing automatically generating a process flow graphical user interface using a symbolic annotation language.

SUMMARY

The present disclosure provides an improved method, system, and computer program product suited to address the aforementioned issues with legacy approaches. More specifically, the present disclosure provides a detailed description of techniques used in methods, systems, and computer program products for automatically generating a process flow graphical user interface using a symbolic annotation language.

Embodiments described herein include a method, system, and computer program product for displaying an automatically generated graphical display of a business process flow to facilitate user interaction with enterprise software applications, and to reduce the resource requirement of performing the same using legacy coding and application graphical user interface development techniques. A compact symbolic annotation language is used in conjunction with a flow generator to automatically generate a computer renderable description of the business process flow. The method commences by defining symbols to form an alphabet to be used in the symbolic annotation language. The compact symbolic language is capable of representing rich semantics including process operations, fork operations, and join operations. Once a particular business process flow has been captured (e.g., using symbols of the compact symbolic annotation language), then a computer process performs a mapping of the symbols to a markup language. The markup language can be rendered in a graphical display. And the markup language supports user interaction in the form of detecting clicks and/or other user-interactions (such as, but not limited to, touch-events) on graphical objects, and a click or other user-interaction can be mapped to an enterprise application module or other step in the business flow. The markup language can be HTML/CSS or some other markup language.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
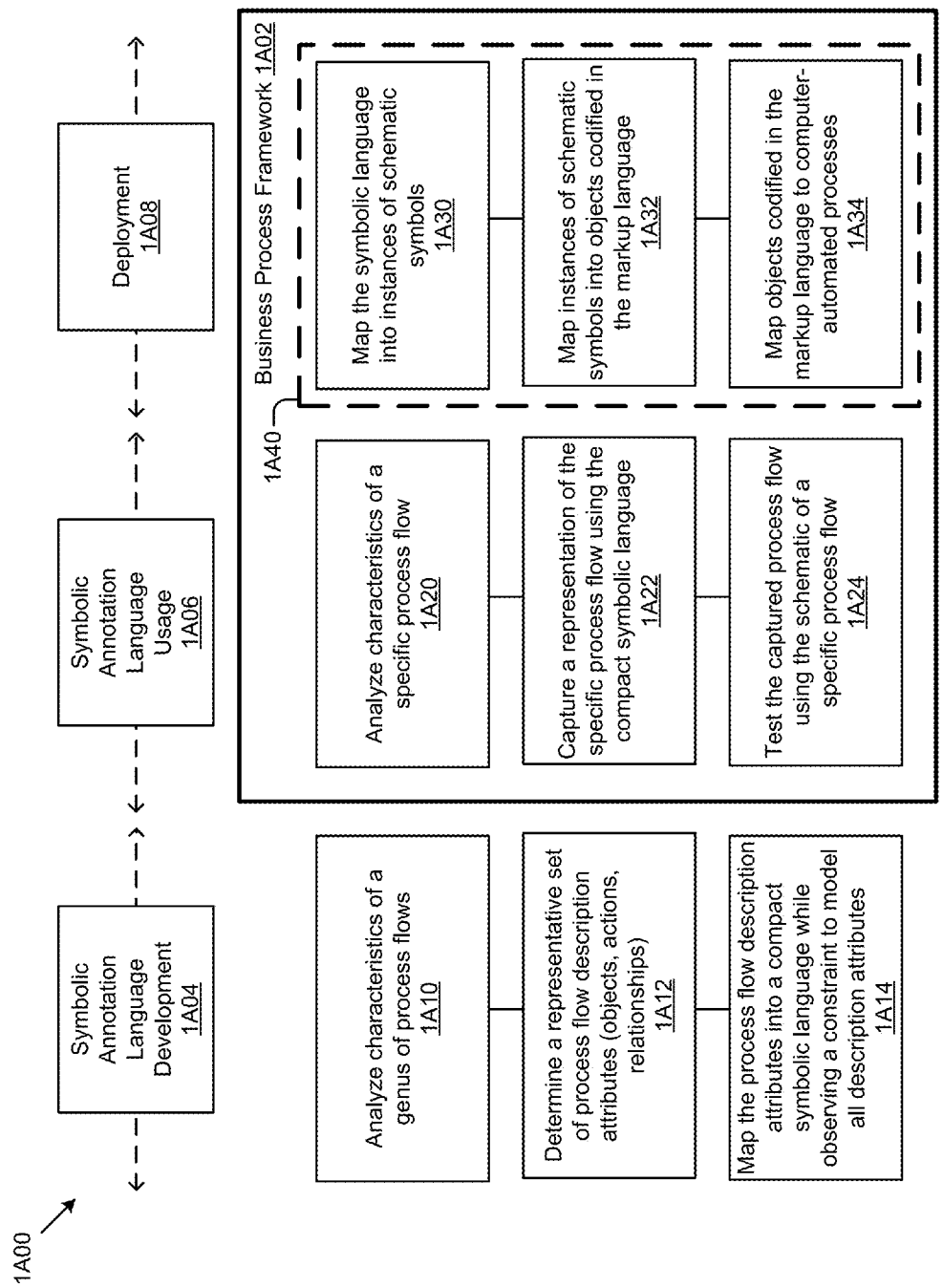
FIG. 1A depicts a lifecycle of a system for automatically generating a process flow graphical user interface using a symbolic annotation language, according to some embodiments.

Some embodiments of the present disclosure are directed to an improved approach for implementing automatically generating a process flow graphical user interface using a symbolic annotation language. More particularly, disclosed herein are environments, methods, and systems for implementing automatically generating a process flow graphical user interface using a symbolic annotation language.

Overview

In running a business, it is common to define and document processes and refine them over time. Moreover, it is common to chain processes together to form an end-to-end flow. In real-world situations, such processes are often performed on the basis of facts or situations present at a particular moment in time. Also, in modern business settings, processes are frequently performed in accordance with a computer-aided model. That is, a human operator might determine when a particular business process is to be executed, and the human operator might even define inputs to the process, even through the process is performed substantially by a business application system (e.g., using a database system, using an accounting package, using Oracle applications, etc.).

Still more, in a modern business setting the aforementioned processes and the chain or flow of processes might be performed repetitively. Moreover, such business process flows can become quite complex, possibly involving hundreds (or thousands or more) steps, decisions, and myriad possibilities of outcomes. Thus, it becomes apparent that the performance of business process flows should be documentable and repeatable.

Legacy systems that have attempted to model business process flows have failed in at least the aspect that modeling a business process flow, and deploying the modeled flow in a manner that serves a computer-aided approach have been cumbersome, sometime demanding a huge amount of resources in terms of programming/engineering, and/or IT manpower as well as in terms of elapsed time required from concept to deployment. Legacy techniques have relied on a graphical user interface comprised primarily of static images (e.g., an image of a process, an image icon representing an input or output), which static images are mapped in some way (e.g., via a mouse click or hover) to an action taken by a computer (e.g., run a particular application, execute a particular database query, etc.). In addition to the costs of development and deployment under a legacy model, making changes often again requires heavy resources. Still worse, legacy models suffer from the costs of ongoing development efforts since the legacy models were not able to consistently and accurately translate the user's intent. For these reasons and others, legacy techniques have proven to be too cumbersome relative to the pace of business.

In addition to the need for improving the pace of deployment (while reducing resource and other cost requirements) there is also a need for consistency (e.g., use of a common GUI template, use of GUI aesthetic guidelines, etc.). One approach is to abstract the creation of business flows and automate some portions of the development using a business process flow framework (see FIG. 1A). Implementations of a business process flow framework serve several objectives:

Business process flow GUIs should not take an excessive period of time to develop.

Business process flow GUIs should be simple and intuitive enough to comprehend by business people, even those who perform substantially non-technical functions.

Business process flow GUIs should be able to cover a wide range of use cases.

Business process flow GUIs should (a) separate content and presentation, and should (b) support evolution of a WYSIWYG editor.

The business process flow framework should be able to output to any one or more of a range of output formats, and such output formats include language support such that the same file is used to generate the end product in whatever languages are desired.

One approach to create a business process flow framework involves the development of an abstracted language, simple enough for a business person to describe the flows in the abstracted language, yet rich enough to support automatic generation of business process flow GUIs in HTML or another markup language. Programming languages (e.g., Java, 'c' or 'c' variants, FORTRAN, etc.) can often satisfy the latter, richness requirement, but do not uniformly satisfy the requirement that the language is simple enough for a business person to describe the business process flows.

Business process flows can be embodied in a variety of ways. Table 1 gives some possibilities.

TABLE 1

Examples of Business Process Flow Embodiments

| Type | Example | Embodiment |
|---|---|---|
| List | A list comprising a plurality of tasks to be performed in the production of a good, or delivery of a service | Paper and pen list. List in a machine readable format. Oral recitation of the list. |
| Flowchart | A flow chart showing a plurality of tasks to be performed in the production of a good, or delivery of a service | Paper and pen description. Flowchart in UML. Flowchart having operations, forks and joins. |
| Algorithm | Steps to be performed in the production of a good, or delivery of a service | An operation manual showing steps, forks and joins. |

The flow language defined has the following attributes:
Symbols: What are the basic elements of the language? For example, a symbol is needed to represents an operation, a fork of a flow, a join in a flow, etc.
Semantics: What do these symbols mean?
Grammar: How are symbols and semantics combined to codify meaning? For example, in the case of a fork, the grammar should support the representation of a flow being split into two sub-flows.

Using this flow language and a flow generator 1A40, simple business flow graphs can be made that:
Are consistent from developer to developer.
Allow for easy global UI changes through CSS.
Uses automation built on a common code development strategy (e.g., object-oriented design with reusable components, etc.).
Can be developed quickly.
Can accommodate complex structure when necessary.

DESCRIPTIONS OF EXEMPLARY EMBODIMENTS

FIG. 1A depicts a lifecycle of a system 1A00 for automatically generating a process flow graphical user interface using a symbolic annotation language. As an option, the present system 1A00 may be implemented in the context of the architecture and functionality of the embodiments described herein. Also, the system 1A00 or any aspect therein may be implemented in any desired environment.

As shown, FIG. 1A describes a flow and constituent steps underlying the flow. The flow includes a subset of steps, namely steps for symbolic annotation language development (see operation 1A04), steps for symbolic annotation language usage (see operation 1A06), and steps for symbolic annotation language deployment (see operation 1A08). Underlying the flow are constituent operations to analyze characteristics of representative species of business flows (see operation 1A10), and from such analysis, to determine a representative set of attributes to be modeled and used in the symbolic annotation language (see operation 1A12). Further, the attributes (e.g., objects, actions, relationships, etc.) are mapped to a compact symbolic language (see operation 1A14). The heretofore-described steps for symbolic annotation language usage can be performed using computer-aided tools, or they can be performed in a fully-automated fashion, using one or more computers.

Continuing the description of FIG. 1A, the constituent steps underlying the flow can be amalgamated into a business process flow framework 1A02, which business process flow framework amalgamates steps for symbolic annotation language usage (see operation 1A06) and steps for symbolic annotation language deployment (see operation 1A08).

Strictly as an example, steps for symbolic annotation language usage can include operations to analyze characteristics of a specific flow (see operation 1A20) and capture a representation of the flow using the symbolic language (see operation 1A22). In exemplary situations, the captured representation of the flow using the symbolic language can be tested, and such testing can include testing for syntactical correctness of the captured representation as well as testing to determine the sense of semantics given in the captured representation (see operation 1A24).

As aforementioned, one aspect of the disclosure herein is to automatically generate a process flow graphical user interface using the symbolic annotation language. Accordingly, certain steps within the business process flow framework 1A02 serve to map the alphabetic symbols found in the captured representation into schematic graphics (e.g., shapes, lines, connectors, etc.), which can in turn be presented on a display surface. Or such steps can serve to map the alphabetic symbols found in the captured representation into code constructs (e.g., type-defs, objects, entities, etc.), which can in turn be used in a markup language (e.g., HTML, CSS, XML, XHTML, UML, etc.). Further, aforementioned code constructs can include a mapping to, or an association with, computer-automated methods (e.g., a CSS class, a Java method, etc.), and, as shown such a mapping can be performed by steps within a flow generator 1A40. More specifically, a flow generator 1A40 can perform mapping of symbolic language constructions into schematic graphics (see operation 1A30), and can perform mapping of the schematic graphics to constructs in a markup language (see operation 1A32), and the constructs in a markup language can further map to computer processes (see operation 1A34). Such mapping operations are further elucidated in the disclosure below.

Figure 1B:
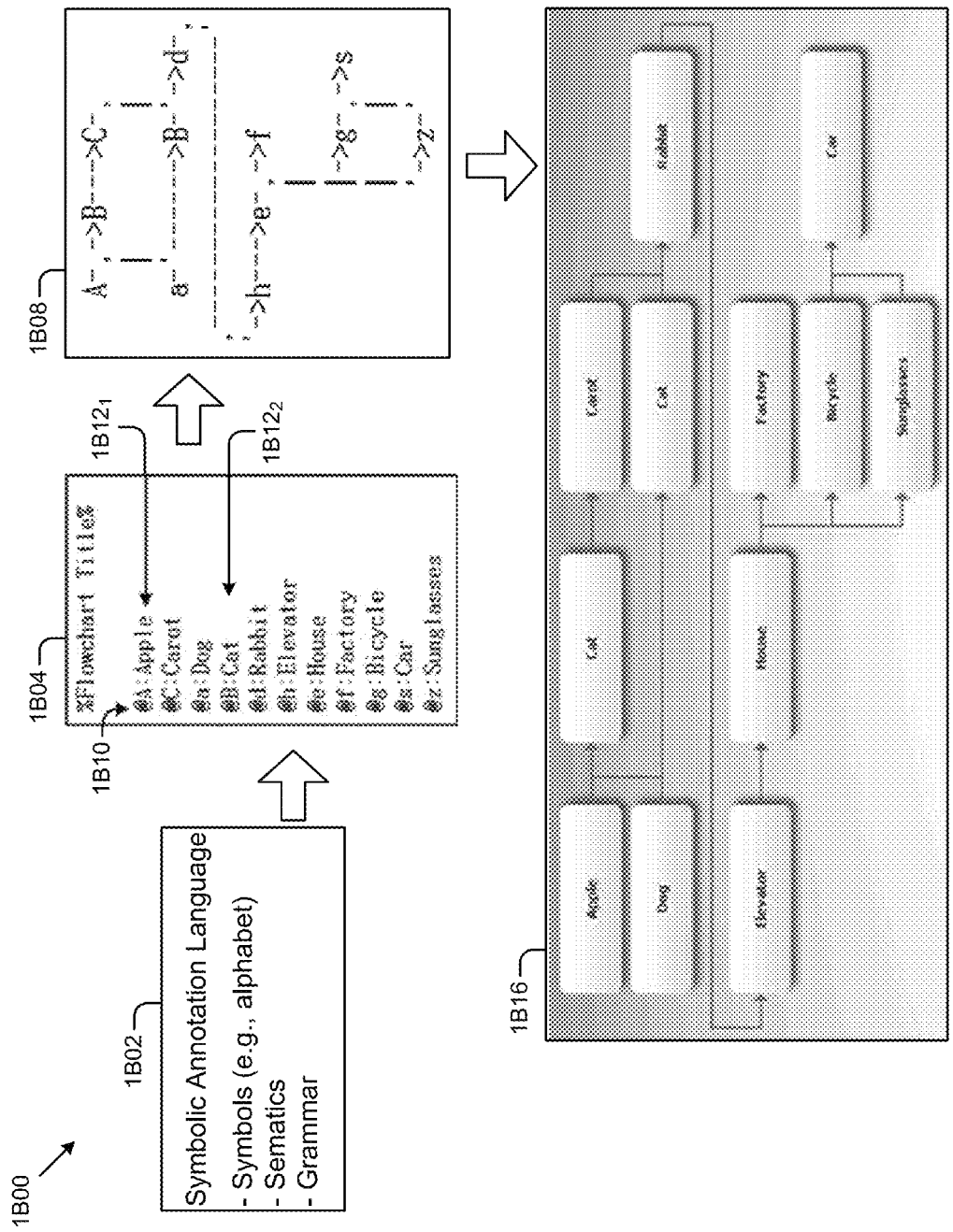
FIG. 1B depicts a transformation for automatically generating a process flow graphical user interface using a symbolic annotation language, according to some embodiments.

FIG. 1B depicts a transformation 1B00 for automatically generating a process flow graphical user interface using a symbolic annotation language. As an option, the present transformation 1B00 may be implemented in the context of the architecture and functionality of the embodiments described herein. Also, the transformation 1B00 of a business flow into a graphical user interface or any aspect therein may be implemented in any desired environment.

As shown, the transformation 1B00 commences with the selection of a compact symbolic annotation language 1B02 comprising symbols in an alphabet, semantics, and grammar. As can be appreciated by those skilled in the art, the symbolic annotation language defined during flow symbolic annotation language development (see operation 1A04) can comprise symbols, semantics, and grammar. In fact, a symbolic annotation language can be relatively simple (and yet comprise symbols, semantics, and grammar) or a symbolic annotation language can be relatively complex.

In the example shown in transformation 1B00 the symbolic annotation language comprises the symbol "@" used as a delimiter symbol 1B10, a set of alpha characters (e.g., "A", "B", "C", etc.) to be used in constructing identifiers, and in constructing labels (e.g., label 1B12$_1$, label 1B12$_2$, etc.). Given additional symbols, two or more identifiers can be connected using the additional symbols, and the connection can be codified in the symbolic language and given semantic meaning. Furthermore, and again referring to the grammar of the symbolic language, the grammar rules provide the mechanism to combine the symbols of the symbolic language in a meaningful way.

As shown, the mechanism to combine the symbols of the symbolic language in a meaningful way comprises editing a text file. Portions of such a text file are given in the compact representation header 1B04, where identifiers used in the compact representation header 1B04 are be used in a compact representation schematic 1B08. The compact representation header 1B04 and the compact representation schematic 1B08 can be stored in a single text file or in separate text files.

Strictly as an example, the compact representation schematic 1B08 depicts a schematic of interrelationships between the identifiers used in the compact representation header 1B04. Specifically, the compact representation schematic 1B08 depicts an interconnection (e.g., representing a business process flow relationship) between identifier "A" and identifier "B" (shown using the hyphen character). Further relationships between identifiers are shown in the compact representation schematic 1B08.

Still further, the compact representation schematic 1B08 is represented using schematic graphics as combined in the graphical display 1B16.

Now, it can be seen that the compact representation schematic 1B08 is represented in the graphical display 1B16, thus comprising a system for automatically generating a process flow graphical user interface (e.g., graphical display 1B16) using a symbolic annotation language (e.g., compact representation schematic 1B08). One or more steps for automatically generating a process flow graphical user interface can be implemented using a general purpose processor with program code, and the automation can be implemented for deployment as computer-aided modules, and/or as a fully-automated modules, or both.

Figure 2A:
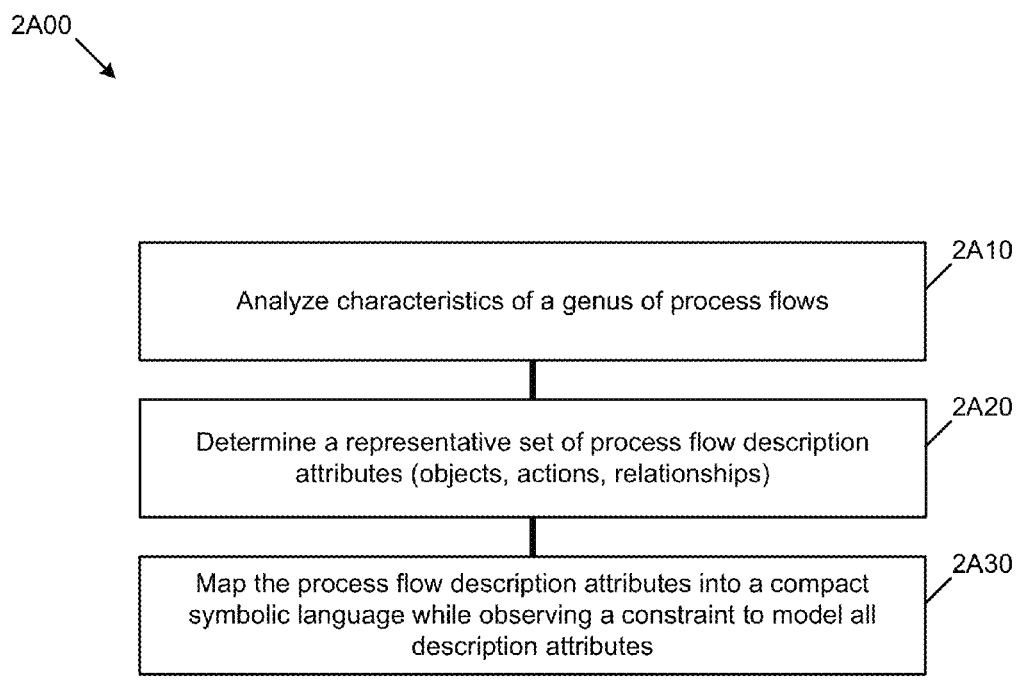
FIG. 2A depicts a flow chart of a system for automatically generating a process flow graphical user interface using a symbolic annotation language, according to some embodiments.

FIG. 2A depicts a flow chart of a system 2A00 for automatically generating a process flow graphical user interface using a symbolic annotation language. As an option, the present system 2A00 may be implemented in the context of the architecture and functionality of the embodiments described herein. Also, the system 2A00 to create a compact symbolic language or any aspect therein may be implemented in any desired environment.

In some embodiments, a compact symbolic language can be defined based on a representative set of flows that are to be modeled. In exemplary cases, there is a minimal set of symbols (e.g., symbols comprising an alphabet) selected to represent a set of analyzed business flow graphs. Such a compact symbolic language can include the following attributes:

An Alphabet (a collection of characters or other symbols such as ASCII or UNICODE characters)
  Analysis can resolve to a minimal set of symbols required to represent the set of analyzed business flow graphs
  In the example given in FIG. 1B, the minimal set is: {'O', '-', '>', ',', '|', ''', and ' '} That is: an {alphanumeric (e.g., the letter O), hyphen, greater-than, comma, pipe, apostrophe, space}.
Semantics
  A letter—represents an application or a report
  A hyphen—represents a portion of a horizontal line connector
  A greater-than symbol—represents an arrowhead pointing to a next process
  A comma—represents a downward branch
  A pipe—represents a simultaneous upward and downward branching
  An apostrophe—represents an upward branch,
Grammar
  Rules to combine these symbols in a meaningful way
  Can optionally include rules to prevent "meaningless" constructs, one example of which would be a "path to nowhere"

In the process of defining the alphabet, the semantics and the grammar rules can undergo analysis, including computer-aided techniques (e.g., a minimization graph, a list processor, a text editor, etc.) that serve to minimize the number of symbols to form an alphabet of a compact symbolic language. In some embodiments, the minimization of the number of symbols to form an alphabet considers semantics and grammar. In particular, some symbols of the alphabet can be used in multiple semantic contexts without ambiguity, for example where otherwise ambiguous alphabetic constructions are resolved by application of one or more grammar rules. Strictly as an example, semantics might include a minimal set of meanings of syntactical formations; for example, semantics and grammar might comprise the semantic meaning of operations (e.g., a first operation, a second operation, etc.), the semantic meaning of a fork, the semantic meaning of a join, and so on.

Sample Flow Description Using a Compact Symbolic Annotation Language

| %Financial Planning Forecasting and Budgeting% |
| --- |
| @A:Forcast Growth Patterns\runE1App('P1406','W1406A') |
| @B:Assign Patterns to Business Unit\runE1App('P1405','W1405A') |
| @C:Generate Forecast Basis\runE1UBEBlind('R1403','XJDE0001','0') |
| @D:Generate Forecast Results\runE1UBEBlind('R1404,'XJDE0001','0') |
| @E:Apply Forecast to Budget\runE1UBEBlind('R1407','XJDE0001','0') |
| @F:Requested Budget\runE1App('P14102','W14102A','ZJDE0001') |
| @G:Approved Budget\runE1App('P14102','W14102A','ZJDE0002') |
| @H:Final Budget\runE1App('P14102','W14102A','ZJDE0003') |
| @I:Budget vs. Actual Reporting\runE1App('P09210A','W09210AA', 'ZJDE0001') |

As shown in the above sample flow description, the sample comprises a header (corresponding to a compact representation header 1B04). A sample flow description using a compact symbolic language can further comprise flow symbols, flow semantics, and meta-information. An example of such a description is given in the compact representation schematic 1B08 of FIG. 1B. Examples and uses of the flow symbols, flow semantics, and meta-information are further described below.

Flow Symbols
    Examples of flow symbols are given below.
    Boxes
    Any alphanumeric character
    Up to 62 distinct boxes (A-Z, a-z, 0-9)
    Meta-information maps a meaning onto these characters
    Lines
    ----
    Arrows
    →
    Branching Points
    -,-- -'-- -|--

Flow Semantics
    Examples of flow semantics are given below.
    Each structural row is in a repeating pattern of fives, and certain symbols are only semantically valid in certain columns:
        For example, if the first box appears in the third column, then boxes can only occur in columns {3, 8, 13, 18, 23, ...}
    Adjacent edges match-up:
        For example, if there exists a downward branch in one row, there must exist some sort of upward branch on the row below.

Meta-Information
    Examples of meta information are given below.
    The title of the flowchart is between percent signs:
        % Flowchart Title %
    Lines beginning with a pound sign are ignored:
        # This line is a comment
    Boxes are defined by @symbol:Text\javascriptAction:
        @A:Forcast Growth Patterns\runE1App('P1406', 'W1406A')
        @C:Generate Forecast Basis\runE1UBEBlind ('R1403','XJDE0001','0')
    In some embodiments, it is possible to expose APIs (e.g., such as runE1App, such as runE1UBE) or, some embodiments support calls to any arbitrary javascript or taking any arbitrary action when interacting with the object. Also, symbols can be defined in any order and at any point in the file. Other possible aspects include:
    Whitespace-only lines are ignored.
    All other lines are considered structural.

Output
Using this flow language and an associated generator, business flow graphs can be made which:
    Are consistent from developer to developer
    Allow for easy global UI changes through CSS (object-oriented design with reusable components)
    Can be developed quickly
    Can accommodate complex structure when necessary So, now again referring to the system 2A00, and considering a desired result to automatically generate a business process flow GUI using a symbolic annotation language, the flow of system 2A00 can be implemented (at least in part) by analyzing the characteristics of a genus of business process flows (see operation 2A10), determining a representative set of attributes to be described in the language (see operation 2A20), and to map the process flow descriptions attributes into a compact (though not necessarily the minimal) set of constructs for a symbolic annotation language (see operation 2A30).

The foregoing operations as shown and described in the flow chart of system 2A00 serve the language development aspects of system 1A00. The language usage and deployment aspects are described hereunder.

Figure 2B:
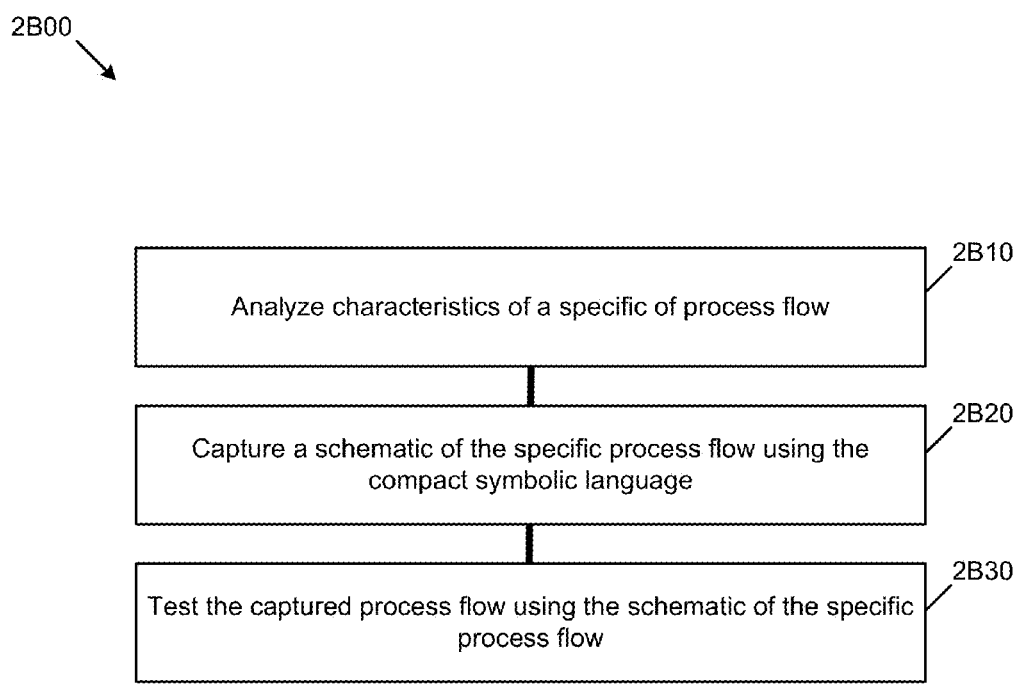
FIG. 2B depicts a flow chart of a system for automatically generating a process flow graphical user interface using a symbolic annotation language, according to some embodiments.

FIG. 2B depicts a flow chart of a system 2B00 for automatically generating a process flow graphical user interface using a symbolic annotation language. As an option, the present system 2B00 may be implemented in the context of the architecture and functionality of the embodiments described herein. Also, the system 2B00 to use a compact symbolic language or any aspect therein may be implemented in any desired environment.

Using the heretofore-described compact symbolic language, business process flow graphs can be authored which:
    Are consistent from developer to developer
    Allow for easy global UI changes through CSS (or other object-oriented design with reusable components)
    Can be developed quickly
    Can accommodate complex structure when necessary In practice, an agent (e.g., a computer agent or a human agent) can analyze the characteristics of a specific business process flow (see operation 2B10) and capture the essence of the flow using the compact symbolic language (see operation 2B20), and test the captured flow using computer-aided modules (see operation 2B30). Such a testing facility can be provided as an interactive module (e.g., operating within or aside an editor), or can be provided as a batch process to be performed after capture of the flow using the compact symbolic language.

Figure 2C:
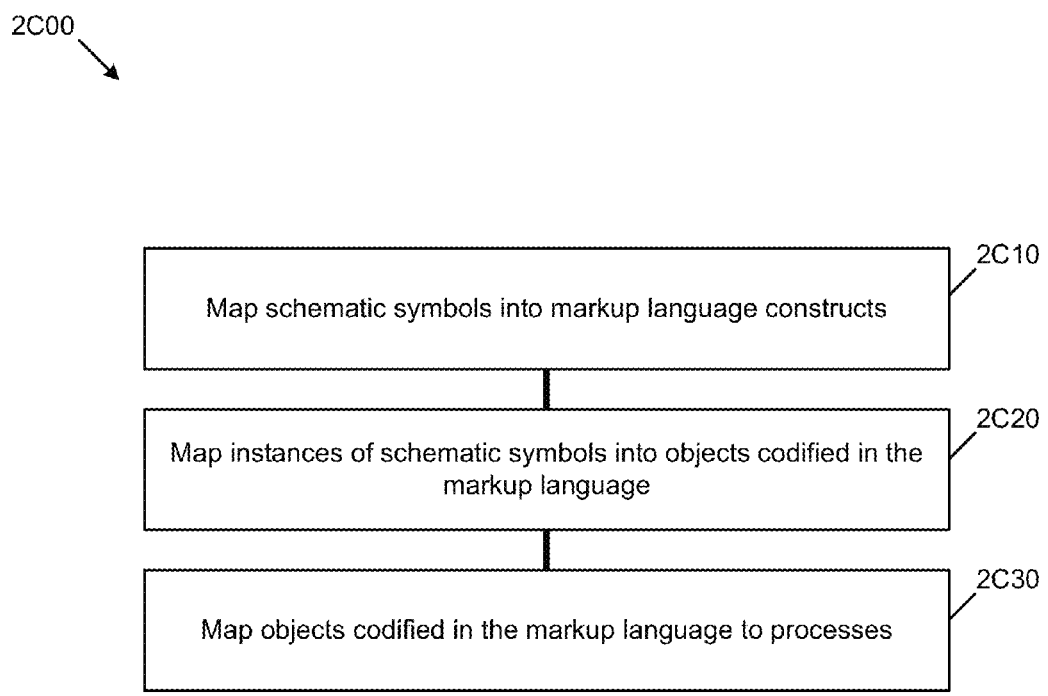
FIG. 2C depicts a flow chart of a system for automatically generating a process flow graphical user interface using a symbolic annotation language, according to some embodiments.

FIG. 2C depicts a flow chart of a system 2C00 for automatically generating a process flow graphical user interface using a symbolic annotation language. As an option, the present system 2C00 may be implemented in the context of the architecture and functionality of the embodiments described herein. Also, the system 2C00 or any aspect therein may be implemented in any desired environment.

Now, having captured the essence of the flow using the compact symbolic language (see operation 2B20), an automated process (such as is depicted in system 2C00 of FIG. 2C) can be used to map the schematic graphics into constructs supported by a selected markup language. For example, an identifier might be mapped to a class in CSS (see operation 2C10) applied to an HTML object. Or, a label might be mapped to an object in HTML such that the label is displayed in a graphical display (see operation 2C20). The aforementioned meta-information can be mapped to markup language constructs such as API subroutine calls or can be mapped to calls to any arbitrary subroutine, such as a subroutine call in javascript, a method call in Java, a subroutine call in a computer programming language, etc. (see operation 2C30). Further, the markup language constructs can be mapped directly (e.g., in a one-to-one correspondence) to computer-implemented processes (e.g., applications or modules found within a suite of enterprise applications).

In exemplary embodiments, it is possible to map the schematic graphics into markup language constructs (e.g., those constructs supported by a selected markup language), and those markup language constructs can be combined in a manner such that the combination can be rendered by a display processor (e.g., a web browser, an XML browser, etc.) to render a graphical representation (e.g., graphical display 1B16) on a display surface. The display surface can be a computer screen, or a mobile device screen, or a projector active region, or any physical or virtual surface capable to serve the purpose of displaying images on a display surface.

Business process flows as discussed herein can be decomposed into a set of components, and those components can be repeated and/or connected so as to form repeating sequences that serve to represent the business process flow in graphic representations that are more human-accessible than are markup language constructs. Some possible examples of the aforementioned markup language constructs can be mapped directly (e.g., in a one-to-one correspondence) from the symbols used in the compact symbolic language to a markup language constructs, and markup language constructs can be mapped directly (e.g., in a one-to-one correspondence) from the markup language constructs to graphical representation. Some examples in the form of tabularized graphical representations are shown and described in the following FIG. 3A through FIG. 3G.

Figure 3A:
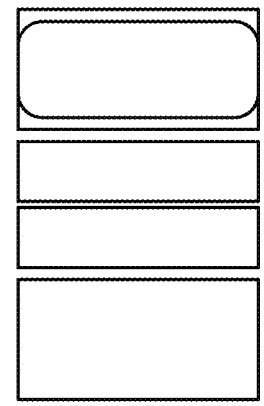
FIG. 3A depicts an operator-type schematic graphic for automatically generating a process flow graphical user interface using a symbolic annotation language, according to some embodiments.

FIG. 3A depicts an operator-type of a schematic graphic 3A00 for automatically generating a process flow graphical user interface using a symbolic annotation language. As an option, the present schematic graphic 3A00 may be implemented in the context of the architecture and functionality of the embodiments described herein. Also, the schematic graphic 3A00 or any aspect therein may be implemented in any desired environment.

In some embodiments, the resultant representation of a process flow that is rendered on a display surface consists of elements arranged in a grid/table/2-dimensional matrix. In one such embodiment, certain elements are eligible to occur only in certain cells of the 2-dimensional matrix. Specifically, which elements can occur in a cell may be governed by what column that cell is in. For instance, a repeating pattern of fives may be used. Specifically, in columns 1, 6, 11, 16, . . . , there is a limited set of valid elements, and that set is common to these columns but may be different from the set of valid elements for another set of columns. For instance, there may be another set of valid elements that can fill a cell from columns 2, 7, 12, 17, . . . . Because there are a very limited number of elements that can go in a particular cell (based on its column), it can be helpful to consider the cell to be a "slot" and the choice of which element populates the cell as a "value" assigned to that slot. That is, there is a one-to-one correspondence between cells and slots, and there is a one-to-one correspondence between elements eligible to be placed in a given cell and values that can be assigned to the corresponding slot. The value assigned to a slot is another way to conceptualize an element (chosen from among a limited set of eligible elements) to be placed in a cell of the 2-dimensional matrix. FIGS. 3A through 3E depict the possible values that can be assigned to the first five slots of a particular row in the matrix. The $6^{th}$ slot has the same set of legal values as the $1^{st}$ slot, and so on. FIGS. 3F and 3G show how different choices for values assigned to the slots in the matrix allow for the creation of complex logical structures, such as joins and branching points. As shown in FIG. 3A, the schematic graphic 3A00 serves to capture an identifier, a label, and further serves to provide spacing that is consistent with other schematic graphics as described infra. In some embodiments, the schematic graphic includes facilities for shading, and/or for borders, and/or for accepting text labels. And, the schematic graphic can be included in a tabular layout such as shown and described in FIG. 3G.

Figure 3B:
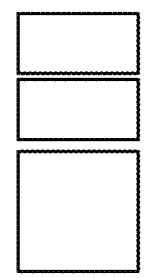
FIG. 3B depicts a continuation connector-type schematic graphic for automatically generating a process flow graphical user interface using a symbolic annotation language, according to some embodiments.

FIG. 3B depicts a continuation connector-type of a schematic graphic 3B00 for automatically generating a process flow graphical user interface using a symbolic annotation language. As an option, the present schematic graphic 3B00 may be implemented in the context of the architecture and functionality of the embodiments described herein. Also, the schematic graphic 3B00 or any aspect therein may be implemented in any desired environment.

The schematic graphic 3B00 serves to capture a horizontal connector, and further serves to provide spacing that is consistent with other schematic graphics as described infra. In some embodiments, the schematic graphic includes facilities for shading, and/or for borders, and/or for accepting text labels. And, the schematic graphic can be included in a tabular layout such as shown and described in FIG. 3G.

Figure 3C:
FIG. 3C depicts a potential junction-type schematic graphic for automatically generating a process flow graphical user interface using a symbolic annotation language, according to some embodiments.

FIG. 3C depicts a potential junction-type of a schematic graphic 3C00 for automatically generating a process flow graphical user interface using a symbolic annotation language. As an option, the present schematic graphic 3C00 may be implemented in the context of the architecture and functionality of the embodiments described herein. Also, the schematic graphic 3C00 or any aspect therein may be implemented in any desired environment.

The schematic graphic 3C00 serves to capture a horizontal connector, with or without a vertical connector, and further serves to provide spacing that is consistent with other schematic graphic as described infra. In some embodiments, the schematic graphic includes facilities for shading, and/or for borders, and/or for accepting text labels. And, the schematic graphic can be included in a tabular layout such as shown and described in FIG. 3G.

Figure 3D:
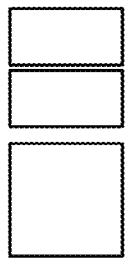
FIG. 3D depicts a continuation connector-type schematic graphic for automatically generating a process flow graphical user interface using a symbolic annotation language, according to some embodiments.

FIG. 3D depicts a continuation connector-type of a schematic graphic 3D00 for automatically generating a process flow graphical user interface using a symbolic annotation language. As an option, the present schematic graphic 3D00 may be implemented in the context of the architecture and functionality of the embodiments described herein. Also, the schematic graphic 3D00 or any aspect therein may be implemented in any desired environment.

The schematic graphic 3D00 serves to capture an additional embodiment of a horizontal connector and further serves to provide spacing that is consistent with other schematic graphic as described infra. In some embodiments, the schematic graphic includes facilities for shading, and/or for borders, and/or for accepting text labels. And, the schematic graphic can be included in a tabular layout such as shown and described in FIG. 3G.

Figure 3E:
FIG. 3E depicts an endpoint-type schematic graphic for automatically generating a process flow graphical user interface using a symbolic annotation language, according to some embodiments.
Figure 3F:
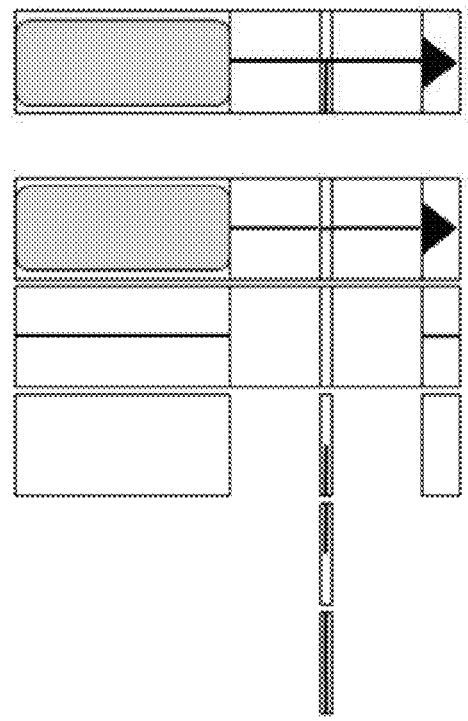
FIG. 3F depicts the valid combinations for automatically generating a process flow graphical user interface using a symbolic annotation language, according to some embodiments.
Figure 3G:
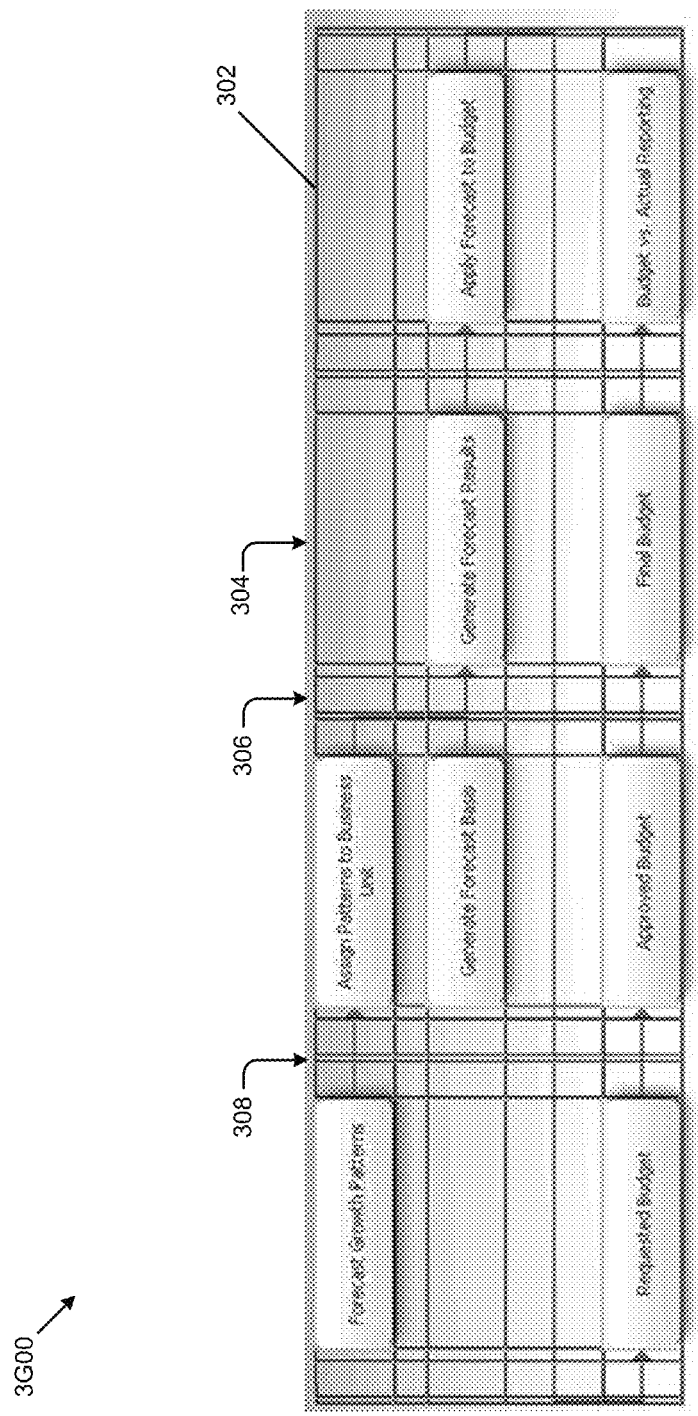
FIG. 3G depicts an example of graphic as coded in an HTML/CSS table for automatically generating a process flow graphical user interface using a symbolic annotation language, according to some embodiments.

FIG. 3E depicts an endpoint-type of a schematic graphic 3E00 for automatically generating a process flow graphical user interface using a symbolic annotation language. As an option, the present schematic graphic 3E00 may be implemented in the context of the architecture and functionality of the embodiments described herein. Also, the schematic graphic 3E00 or any aspect therein may be implemented in any desired environment.

The schematic graphic 3E00 serves to capture connectors, and further serves to provide spacing that is consistent with other schematic graphic as described infra. In some embodiments, the schematic graphic includes facilities for shading, and/or for borders, and/or for accepting text labels. And, the schematic graphic can be included in a tabular layout such as shown and described in FIG. 3G.

FIG. 3F depicts the valid combinations 3F00 for automatically generating a process flow graphical user interface using a symbolic annotation language. As an option, the present combinations 3F00 may be implemented in the context of the architecture and functionality of the embodiments described herein. Also, the valid combinations 3F00 of schematic graphics used in the disclosed systems or any aspect therein may be implemented in any desired environment.

The valid combinations 3F00 serve to show valid combinations for combining the schematic graphics of FIG. 3A through FIG. 3E.

FIG. 3G depicts an example of a graphic as coded in an HTML/CSS table 3G00 for automatically generating a process flow graphical user interface using a symbolic annotation language. As an option, the present CSS table 3G00 may be implemented in the context of the architecture and functionality of the embodiments described herein. Also, the HTML/CSS table 3G00 used in systems or any aspect therein may be implemented in any desired environment.

The HTML/CSS table 3G00 as shown is purely exemplary and other forms are possible and contemplated. As shown, the HTML/CSS table 3G00 is characterized by the presence of a table border 302, which table border may or may not be present in a given embodiment, or the table border 302 might be present, but not visibly displayed (e.g., in the case of a white border on a white background). The table comprises columns of various widths, for example a wide width column 304, a medium width column 306 and a narrow width column 308.

Figure 4:
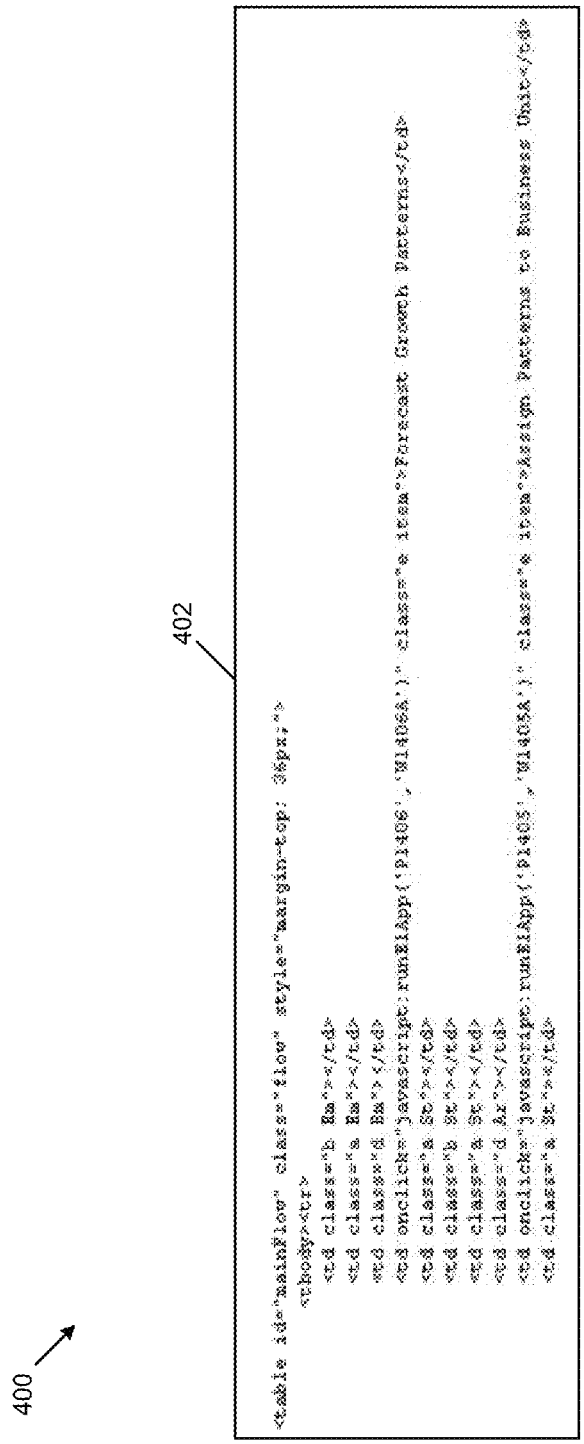
FIG. 4 depicts a CSS class usage in HTML code for automatically generating a process flow graphical user interface using a symbolic annotation language, according to some embodiments.

FIG. 4 depicts a CSS class usage in HTML code 400 for automatically generating a process flow graphical user interface using a symbolic annotation language. As an option, the present HTML code 400 may be implemented in the context of the architecture and functionality of the embodiments described herein. Also, the HTML code 400 or any aspect therein may be implemented in any desired environment.

The shown CSS class usage 402 is just a segment of the CSS code to describe a table. The portion shown comprises a table (see the tag beginning with "table"), a table body (see the tag "<tbody>"), a table row (see the tag "<tr>"), and a series of table row definitions (see the occurrences of the tag "<td>"). Also note the occurrences of the tag "<td>" with the attribute "onclick". More particularly, the given HTML code serves to call an API subroutine (or a call to any arbitrary subroutine that can be executed by the display processor). In some cases an object receives an "onclick" event, and the aspects of the event are in turn passed on in calls to one or more subroutines.

Figure 5:
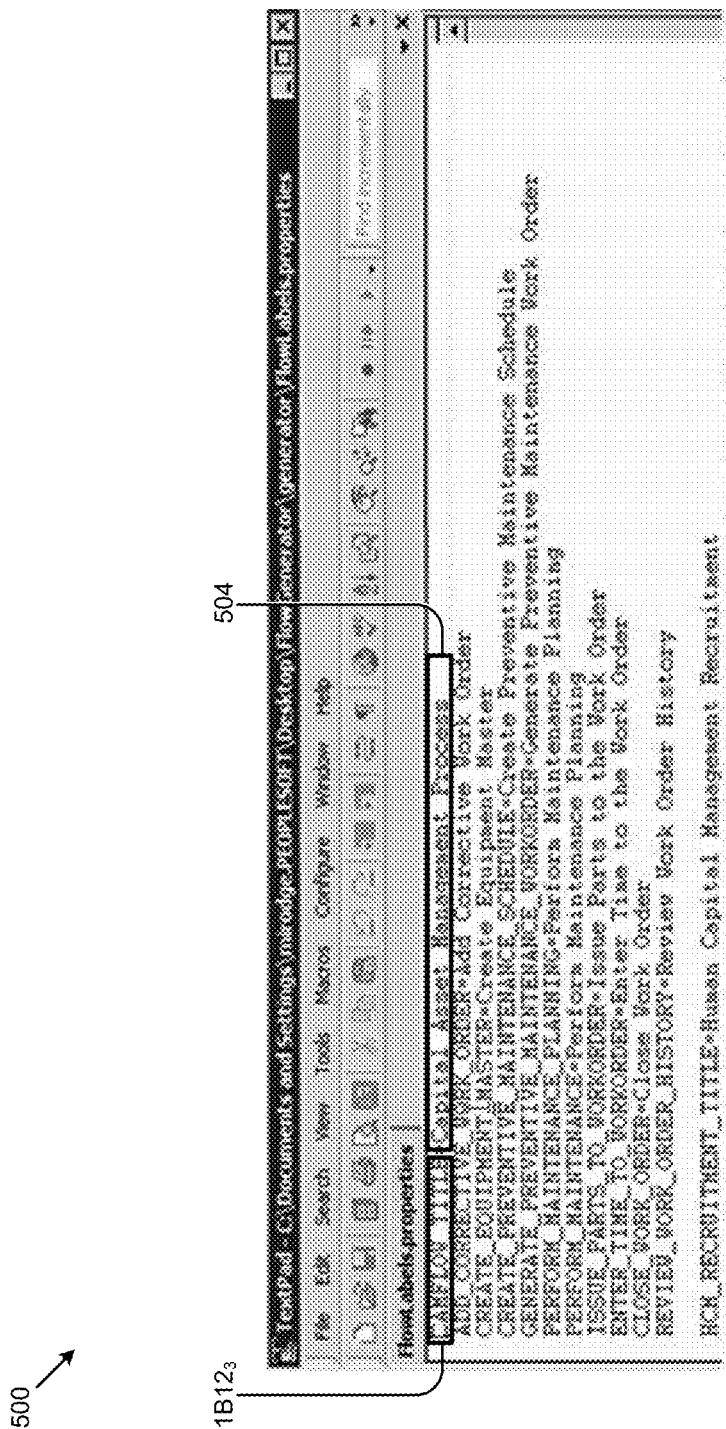
FIG. 5 depicts a language localization file used to implement localized flow label mapping for automatically generating a process flow graphical user interface using a symbolic annotation language, according to some embodiments.

FIG. 5 depicts a language localization file used to implement a localized flow label mapping 500 for automatically generating a process flow graphical user interface using a symbolic annotation language. As an option, the present localized flow label mapping 500 may be implemented in the context of the architecture and functionality of the embodiments described herein. Also, the localized flow label mapping 500 or any aspect therein may be implemented in any desired environment.

As shown, the text of the language localization file includes a label $1B12_3$ on the same text line as its associated localized flow label 504. Thus, a business process flow that has been captured in the compact symbolic language can be localized to use any label in any language merely by presenting the mapping in a form similar to the localized flow label mapping 500.

Figure 6:
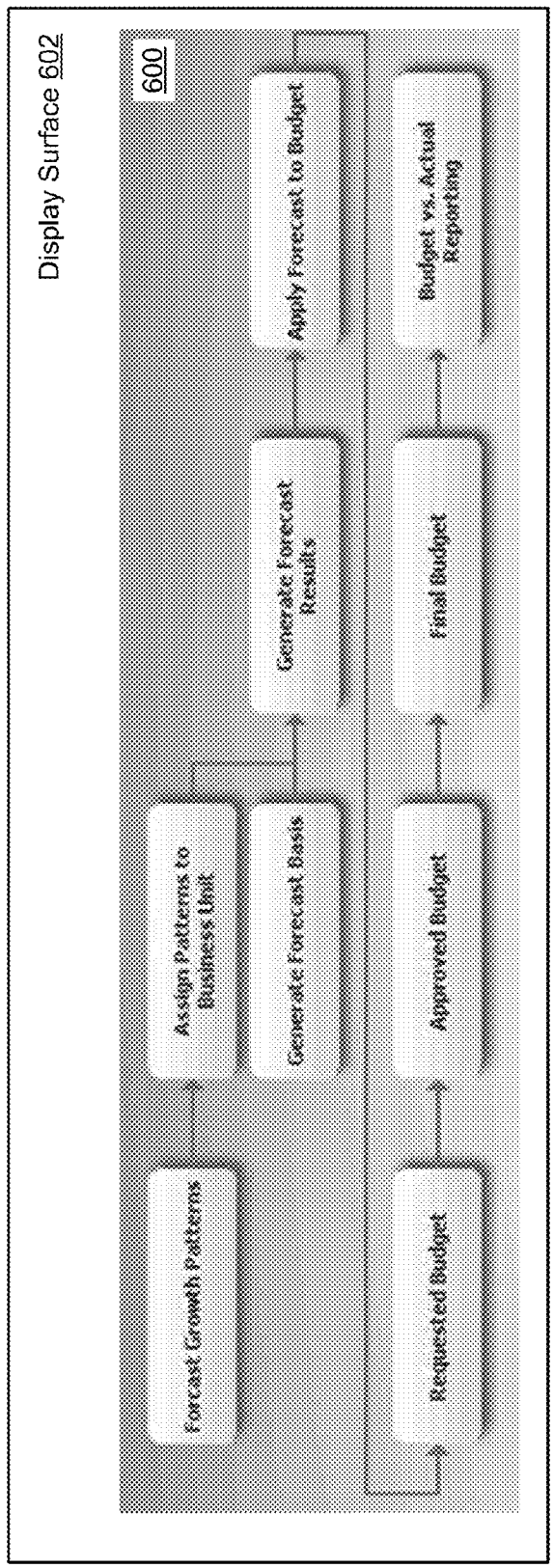
FIG. 6 depicts an example that results from automatically generating a process flow graphical user interface using a symbolic annotation language, according to some embodiments.

FIG. 6 depicts an example output 600, displayed on a display surface 602, which output results from automatically generating a process flow graphical user interface using a symbolic annotation language. As an option, the present example output 600 may be implemented in the context of the architecture and functionality of the embodiments described herein. Also, the example output 600 of a system or any aspect therein may be implemented in any desired environment.

Some or all of the steps as shown within the business process flow framework can be combined. Given a business flow captured in the compact symbolic language as described herein, an automated module (e.g., flow generator 1A40) can automatically generate code that captures the given process flow, which is then rendered in a graphical user interface (e.g., on display surface 602).

Still further, a business flow can be captured using a GUI tool. Such a GUI tool can be used by a user to input a representation of a business flow in terms of graphical objects, and a compiler or interpreter or other translator can in turn output the business flow in a symbolic annotation language representation. Then, given the business flow found in the symbolic annotation language representation, the techniques described herein can be used to output renderable markup language for display. Moreover, the capturing can be performed in an offline process (e.g., independent of operation of the aforementioned enterprise software applications) or in a online process (e.g., within or during the operation of the aforementioned enterprise software applications). And the capturing, whether performed online or performed offline, can use any of the capturing or editing techniques discussed herein, including offline editing of a text file, or offline editing using a GUI, or online editing of a text file, online editing using a GUI.

Additional Embodiments of the Disclosure

Figure 7:
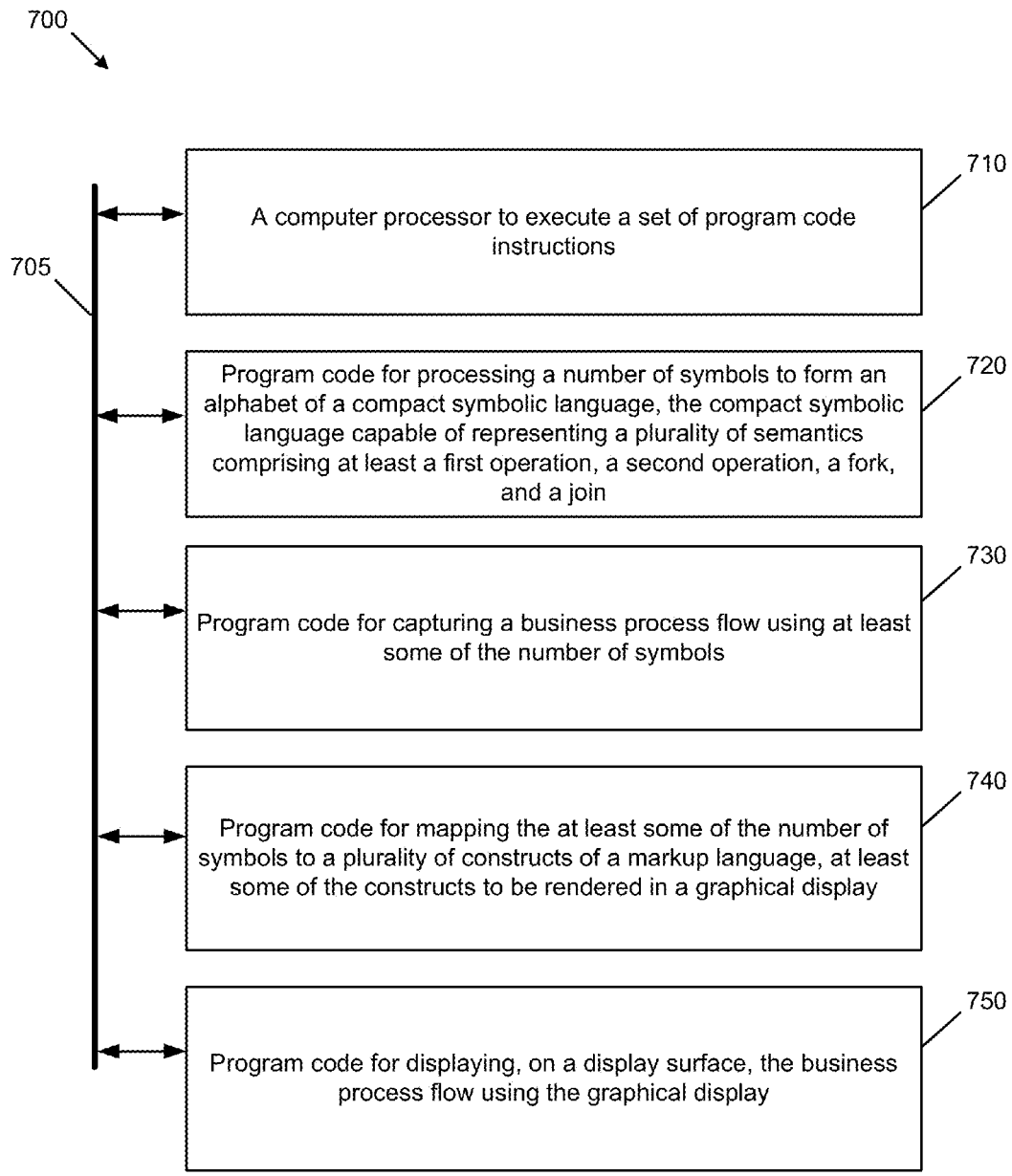
FIG. 7 depicts a block diagram of a system to perform certain functions of a computer for automatically generating a process flow graphical user interface using a symbolic annotation language, according to some embodiments.

FIG. 7 depicts a block diagram of a system to perform certain functions of a computer system. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: minimizing and/or receiving a number of symbols to form an alphabet of a compact symbolic language, the compact symbolic language capable of representing a plurality of semantics comprising at least a first operation, a second operation, a fork, and a join (see module 720); capturing a business process flow using at least some of the number of symbols (see module 730); mapping the at least some of the number of symbols to a plurality of constructs of a markup language, at least some of the constructs to be rendered in a graphical display (see module 740); and displaying, on a display surface, the business process flow using the graphical display (see module 750).

System Architecture Overview

Figure 8:
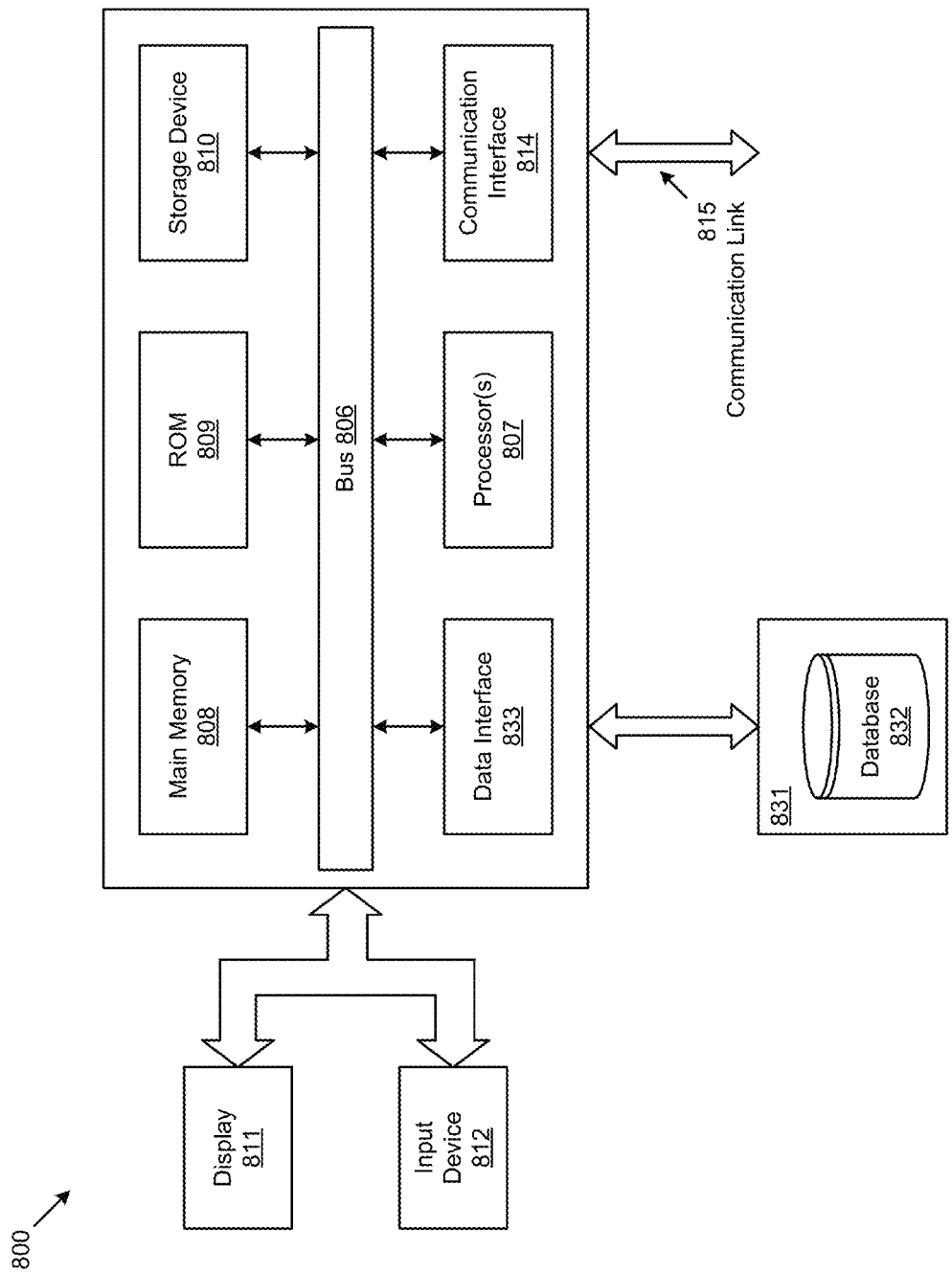
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device 809 (e.g., ROM), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device 809 or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to other embodiments of the disclosure, two or more computer systems 800 coupled by a communication link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communication link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for displaying on a display surface an automatically generated graphical display using a symbolic annotation language, the method comprising:

analyzing a business process flow genus to form an alphabet of a compact symbolic language representing a plurality of semantics from a number of symbols, wherein the analyzing comprises determining a representative set of process flow description attributes;

capturing a business process flow using one or more symbols of the number of symbols, the business process flow being a species of the business process flow genus, wherein capturing the business process flow using the one or more symbols of the number of symbols comprises mapping the representative set of process flow description attributes into the compact symbolic language while observing a constraint and analyzing characteristics of the business process flow, the business process flow being a species of the business process flow genus;

testing the captured business process flow using a schematic of the business process flow;

mapping the one or more symbols of the number of symbols to a plurality of constructs of a markup language, one or more constructs of the plurality of constructs to be rendered in a graphical display, wherein mapping the one or more symbols of the number of symbols to the plurality of constructs of the markup language comprises mapping the one or more symbols of the compact symbolic language to a plurality of instances of schematic symbols, mapping the plurality of instances of schematic symbols to the plurality of constructs of the markup language, and mapping the plurality of constructs of the markup language to a plurality of computer-automated processes; and automatically generating and displaying, on a display surface, the business process flow in a graphical user interface using the symbolic annotation language wherein displaying the business process flow is based on the plurality of computer-automated processes.

2. The method of claim 1, further comprising receiving at least one subroutine call codified in the markup language.

3. The method of claim 1, wherein the compact symbolic language comprises only combinations of UNICODE characters.

4. The method of claim 1, wherein the capturing comprises at least one of, offline editing of a text file, or offline editing using a GUI, or online editing.

5. The method of claim 1, wherein the mapping comprises a one-to-one mapping.

6. The method of claim 1, wherein the markup language comprises at least one of HTML, XHTML, and CSS.

7. The method of claim 1, wherein the plurality of constructs of the markup language comprises at least one of, an HTML table, a CSS class attribute, an onclick attribute.

8. The method of claim 1, wherein the compact symbolic language is an abstracted and non-executable language capable of representing a plurality of semantics.

9. The method of claim 1, wherein capturing a business process flow using one or more symbols of the number of symbols comprises combining the one or more symbols using a grammar by editing a text file or using a GUI tool.

10. The method of claim 1, wherein displaying, on a display surface, the business process flow using the graphical display comprises rendering the plurality of constructs of the markup language on the display surface.

11. The method of claim 1, wherein the one or more symbols of the number of symbols are mapped to the plurality of constructs of the markup language such that the plurality of constructs of the markup language describes the captured business process flow.

12. A computer system for displaying on a display surface an automatically generated graphical display using a symbolic annotation language, the system comprising:

a computer processor to execute a set of program code instructions; and a memory to hold the program code instructions, in which the program code instructions comprises program code to perform, analyzing a business process flow genus to form an alphabet of a compact symbolic language representing a plurality of semantics from a number of symbols, wherein the analyzing comprises determining a representative set of process flow description attributes;

capturing a business process flow using one or more symbols of the number of symbols, the business process flow being a species of the business process flow genus, wherein capturing the business process flow using the one or more symbols of the number of symbols comprises mapping the representative set of process flow description attributes into the compact symbolic language while observing a constraint being a species of the business process flow genus;

testing the captured business process flow using a schematic of the business process flow;

mapping the one or more symbols of the number of symbols to a plurality of constructs of a markup language, one or more constructs of the plurality of constructs to be rendered in a graphical display, wherein mapping the one or more symbols of the number of symbols to the plurality of constructs of the markup language comprises mapping the one or more symbols of the compact symbolic language to a plurality of instances of schematic symbols, mapping the plurality of instances of schematic symbols to the plurality of constructs of the markup language, and mapping the plurality of constructs of the markup language to a plurality of computer-automated processes; and automatically generating and displaying, on a display surface; the business process flow in a graphical user interface using the symbolic annotation language wherein displaying the business process flow is based on the plurality of computer-automated processes.

13. The computer system of claim 12, the program code instructions further comprising program code to perform receiving at least one subroutine call codified in the markup language.

14. The computer system of claim 12, wherein the compact symbolic language comprises only combinations of UNICODE characters.

15. The computer system of claim 12, wherein the capturing comprises at least one of, offline editing of a text file, or offline editing using a GUI, or online editing.

16. The computer system of claim 12, wherein the compact symbolic language is an abstracted and non-executable language capable of representing a plurality of semantics.

17. A computer program product embodied in a non-transitory computer readable medium, the computer readable medium having stored thereon a sequence of instructions which, when executed by a processor causes the processor to execute a method for displaying on a display surface an automatically generated graphical display using a symbolic annotation language; the method comprising:

analyzing a business process flow genus to form an alphabet of a compact symbolic language representing a plurality of semantics from a number of symbols, wherein the analyzing comprises determining a representative set of process flow description attributes;

capturing a business process flow using one or more symbols of the number of symbols; the business process flow being a species of the business process flow genus, wherein capturing the business process flow using the one or more symbols of the number of symbols comprises mapping the representative set of process flow description attributes into the compact symbolic language while observing a constraint and analyzing characteristics of the business process flow, the business process flow being a species of the business process flow genus;

testing the captured business process flow using a schematic of the business process flow;

mapping the one or more symbols of the number of symbols to a plurality of constructs of a markup language, one or more constructs of the plurality of constructs to be rendered in a graphical display, wherein mapping the one or more symbols of the number of symbols to the plurality of constructs of the markup language comprises mapping the one or more symbols of the compact symbolic language to a plurality of instance of schematic symbols, mapping the plurality of instances of schematic symbols to the plurality of constructs of the markup language, and mapping the plurality of constructs of the markup language to a plurality of computer-automated processes; and automatically generating and displaying, on a display surface, the business process flow in a graphical user interface using the symbolic annotation language wherein displaying the business process flow is based on the plurality of computer-automated processes.

18. The computer program product of claim 17, the method further comprising receiving at least one subroutine call codified in the markup language.

19. The computer program product of claim 17, wherein the compact symbolic language is an abstracted and non-executable language capable of representing a plurality of semantics.

* * * * *